United States Patent Office 3,487,782
Patented Jan. 6, 1970

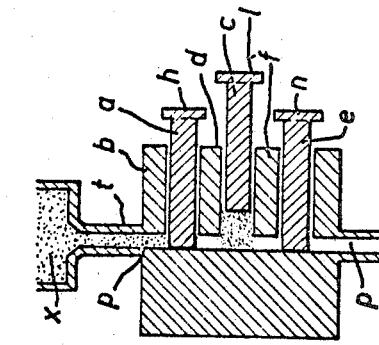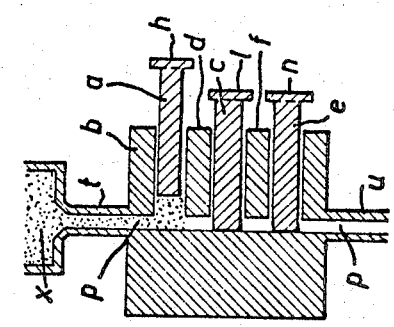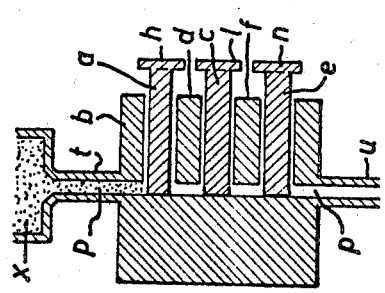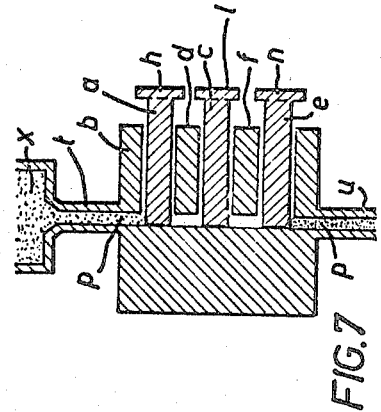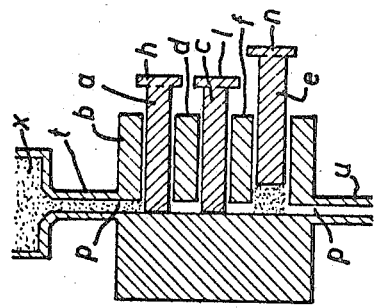

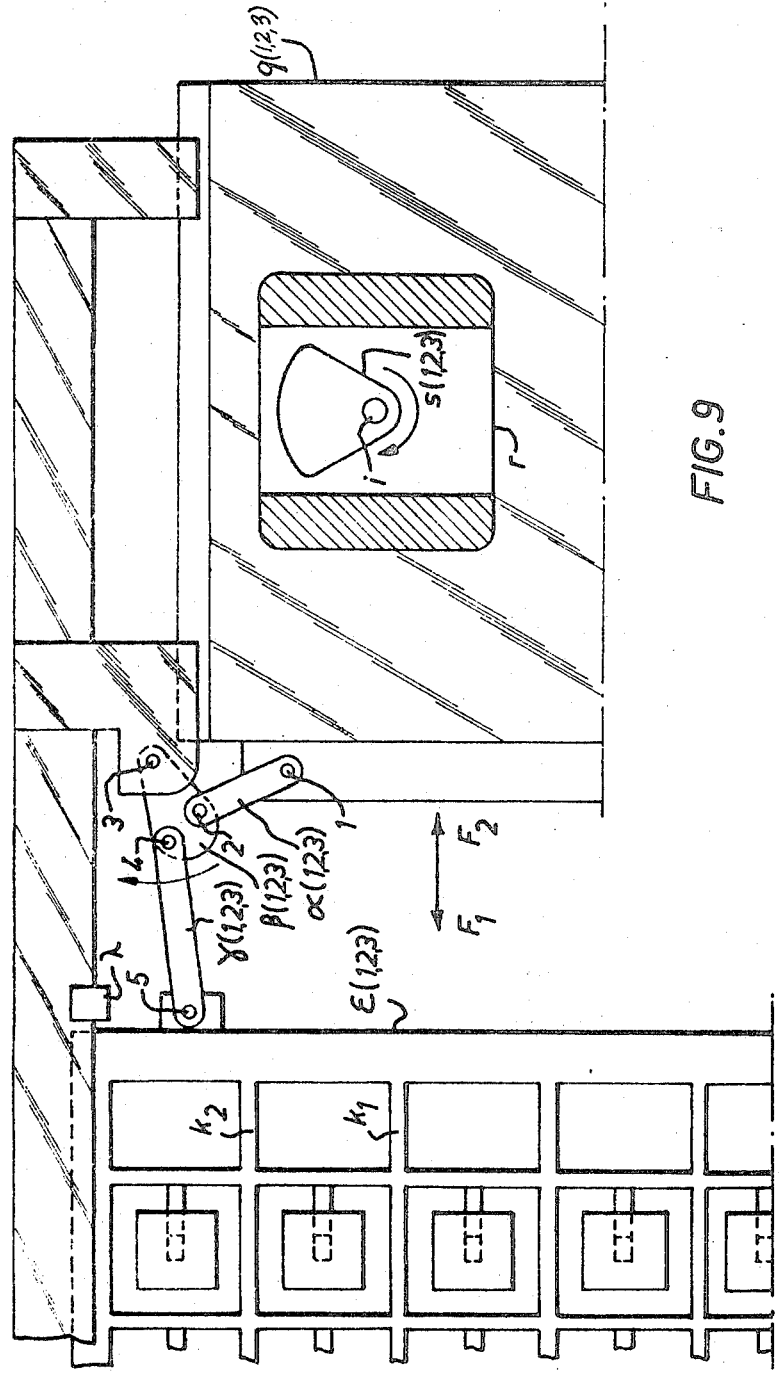

3,487,782
METHOD OF AND APPARATUS FOR THE DELIVERY OR EXTRACTION, SEVERAL TIMES SIMULTANEOUSLY, OF A PREDETERMINED VOLUME OF FLUID
Jean-Georges Henrotte, Paris, France, assignor to Centre National de la Recherche Scientifique, Paris, France, a public institution of France
Filed Oct. 9, 1967, Ser. No. 673,698
Claims priority, application France, Oct. 10, 1966, 79,373
Int. Cl. F04b 13/02, 19/06; B67d 5/52
U.S. Cl. 103—6                                                                               9 Claims

ABSTRACT OF THE DISCLOSURE

A multi-stage volumetric pump permitting a determined volume of fluid to be transferred, characterized by at least three driving units arranged in series, each driving unit comprising a piston and a cylinder, the driving units communicating with each other by a cylindrical orifice located at the extremity of the driving units close to the bottom of the cylinders, the said orifices being connected on each side of the driving units to two fluid reservoirs, the driving units having dimensions adapted to the volumes which it is desired to deliver whereby the travel of the pistons is of small amplitude and the delivery time is of short duration.

---

The present invention relates to a method and an apparatus intended for automatically extracting or delivering precise volumes of fluids, in such manner that a large number of samples can be treated simultaneously.

The method and the apparatus of the present invention are more precisely designed to facilitate and accelerate handling in the field of analytical and synthetic chemistry.

Instruments designed for this purpose up to the present time are based on a system of manipulations "in series," that is to say, the various samples to be distributed or to be taken are treated successively at a more or less rapid rate which is limited by the time of flow of the fluids and by the inertia of the pump or piston system.

In order to avoid the disadvantageous features of the instruments designed up to the present time, the applicant has designed an apparatus based on a method of manipulations "in parallel." The basic principle of the invention is constituted by the simultaneous operation of a group of identical feeding devices arranged in parallel.

Each feeding device is composed of a number of driving units communicating with each other, which are connected in series and enable a predetermined volume of fluid to be transferred from one reservoir to another. As the corresponding driving units of all the feed devices are connected to each other and work together jointly, the feed devices can therefore transfer a certain volume of fluid simultaneously from a number of reservoirs which are themselves arranged in parallel. The manner in which the apparatus is designed enables it to effect the transfer of the volume of fluid in a very short time, and to repeat the same operation a large number of times. In consequence, the final volume transferred can be modified at will as a function of the total number of repetitions.

The present invention therefore proposes, in particular: to provide a method for the manipulation of fluids of the same nature or of different natures, characterized by the fact that predetermined quantities of fluid contained in one or more reservoirs are simultaneously extracted by means of feed devices arranged in parallel and working together jointly to follow a continuous cycle, and that the quantities extracted are delivered by means of the said feed devices into one or more other reservoirs.

The method of the invention makes it possible to extract or deliver variable volumes at will over an extended range, by virtue of a simple and reproducible regulation.

The method of the invention further enables the same volume of fluid to be extracted or delivered simultaneously from a number of different fluids.

By reason of the simultaneous operation of the deliveries or the extractions, the method of the invention makes it possible to obtain with accuracy high efficiencies which were not previously obtained.

The invention further proposes to construct an installation for carrying into effect the above method, of easy and economic manufacture which requires only one single precision part, the driving unit, of which a large number can be made by repetition methods.

Other objects, particular features and advantages of the present invention will be brought out during the course of the description given below of a preferred form of embodiment of the said invention, reference being made to the accompanying drawings, in which.

Figure 1:
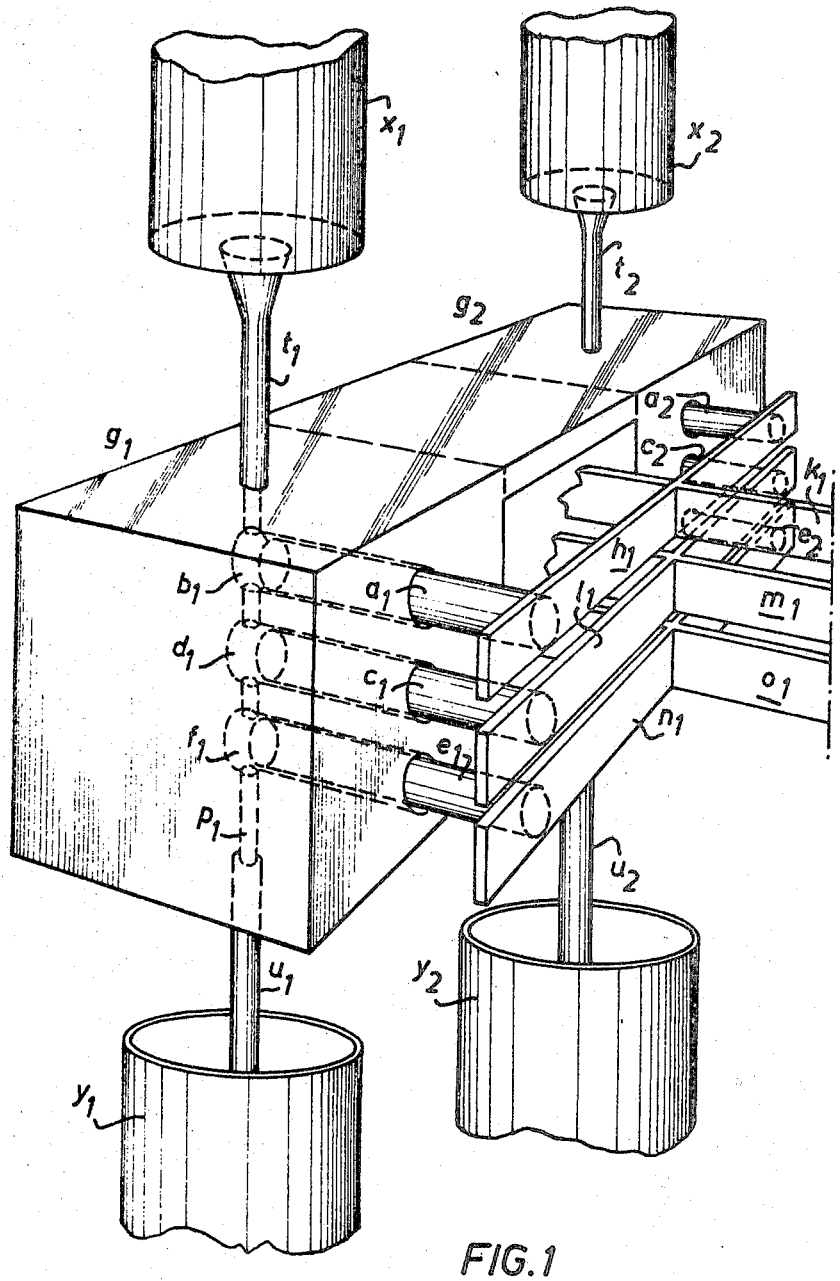
FIG. 1 shows in perspective two feed devices $g_1$ and $g_2$. The cylinders and the portions of the pistons which are engaged in them cannot be seen from the exterior; their positions in the feed device are indicated in broken lines.

FIGS. 3, 4, 5, 6 and 7 schematically represent in cross-section a feed device according to FIG. 1, in various positions during the course of the operation of the apparatus.

Figure 8:
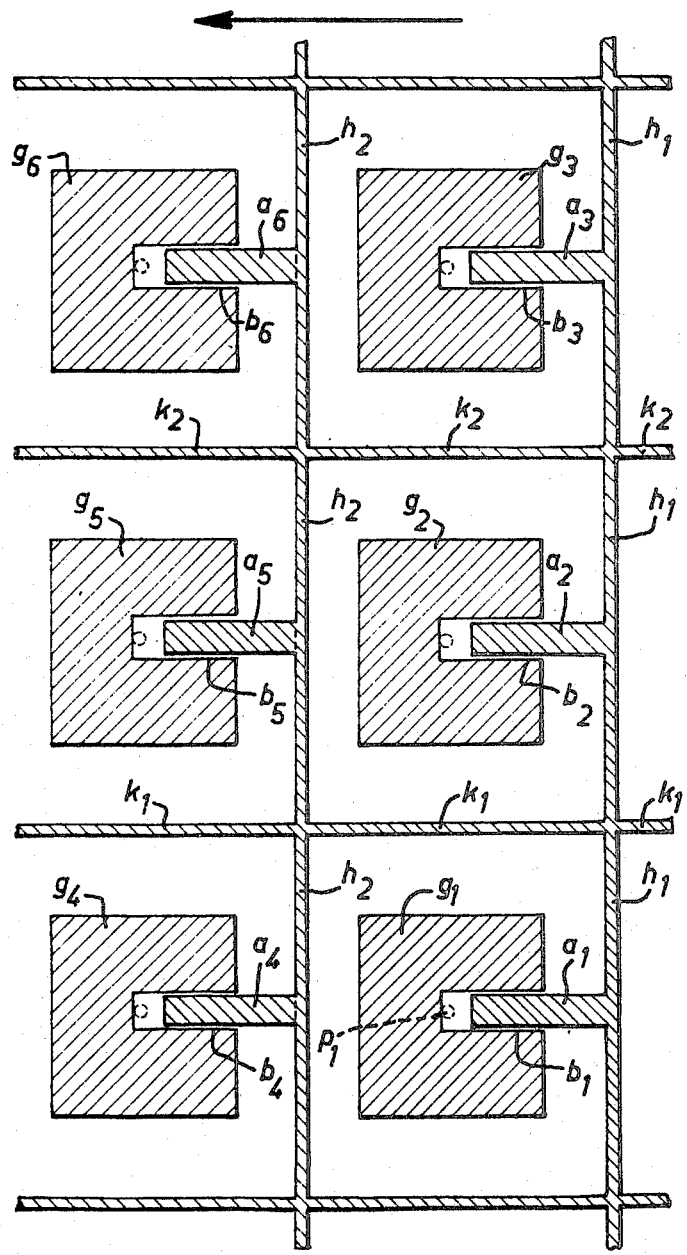

FIG. 8 shows a transverse section taken at the level of the units $ab$ of a group of feed devices.

FIG. 9 shows a plan view of the driving mechanism of the apparatus.

Figure 2:
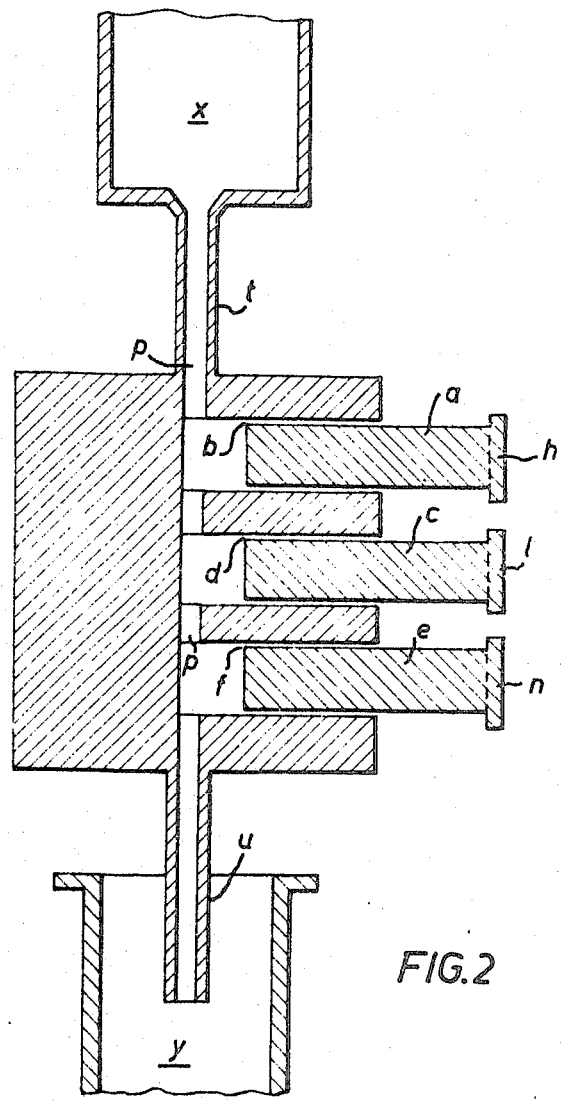
FIG. 2 is a vertical section of a feed device taken along the axis of the opening $p$.

Referring first of all to FIGS. 1 and 2 of the drawings, it is seen that the apparatus for carrying the method into effect is composed of a number of identical driving units arranged in parallel series. A driving unit comprises a piston and a cylinder. It is designated by the symbols given to the piston and to the cylinder by which it is constituted. Thus, the piston $a_1$ and the cylinder $b_1$ form the driving unit $a_1b_1$. The driving units arranged in series communicate with each other by a cylindrical opening, the axis of which is perpendicular to that of the piston. The opening is widened close to the bottom of the cylinders of each unit. A group of driving units in communication constitutes a feed device.

For example, the driving units $a_1b_1$, $c_1d_1$ and $e_1f_1$ communicating with each other through the opening $p_1$ constitute the feed device $g_1$. Similarly, the driving units $a_2b_2$, $c_2d_2$ and $e_2f_2$ communicating with each other by an opening similar to $p_1$ form the feed device $g_2$. The openings are extended to each of the extremities by pipes $t_1$, $t_2$ and $u_1$, $u_2$ which communicate with reservoirs $x_1$, $x_2$ and $y_1$, $y_2$.

Each feed device is composed of at least three driving units, which is necessary in order to deliver or extract a predetermined volume of fluid.

Only two feed devices $g_1$ and $g_2$ placed in parallel have been shown in FIG. 1 although it is possible to put a larger number of feed devices side by side for simultaneous operation, which will become clear from the subsequent description.

It will be stated that a driving unit is closed when its piston is fully engaged in its cylinder, and that it is open when its piston is partly withdrawn from the cylinder, the pistons being movable along their axis. The distance travelled by the piston between the two positions constitutes the travel of this piston. This travel is identically the same for all the pistons. The means employed to achieve this will be explained later.

Taking into account the above preliminary definitions and referring now to FIGS. 3, 4, 5, 6 and 7, it will be assumed that it is desired to deliver a certain volume of liquid from the reservoir $x$ which is filled with this liquid to the reservoir $y$ which is empty.

At the start, the units $ab$, $cd$ and $ef$ are closed (see FIG. 3). In a first period, the unit $ab$ is open (FIG. 4). A determined volume of liquid is thus sucked by the unit $ab$ through the opening $p$ from the pipe $t$ and from the reservoir $x$. This volume, which will be called $v$, depends on the one hand on the diameter of the unit and on the other hand on the travel of the pistons.

In a second period, the unit $ab$ is re-closed while the unit $cd$ is open (FIG. 5). In order to avoid any over-compression of liquid, the movements of the pistons $a$ and $c$ should be strictly simultaneous or, better still, the movement of the piston $a$ should have a slight delay with respect to that of the piston $c$. At the end of the second period, the liquid which was in $ab$ is now in $cd$. In the third period, the unit $cd$ is similarly re-closed while the unit $ef$ is open (FIG. 6). Finally, at the last period, the unit $ef$ is re-closed (FIG. 7) and the liquid is expelled into the pipe $u$ and the reservoir $y$ (not shown).

This series of movements constitutes a complete cycle during the course of which the liquid volume $v$, initially contained in the pipe $t$ and the reservoir $x$, is now contained in the pipe $u$ and the reservoir $y$. If it is desired to deliver, from $x$ to $y$, a volume V which is equal to $n$ times $v$, it is only necessary to repeat the same cycle $n$ times.

The movements of the pistons shown in FIGS. 3, 4, 5, 6 and 7 are generated by any appropriate means such as a reversible motor with variable speed, driving a shaft comprising at least three cams respectively in contact with the projecting parts of the pistons $a$, $c$ and $e$, the said cams being designed in such manner as to impress on the pistons the movements shown in FIGS. 3, 4, 5, 6 and 7. Any other driving system could be utilized, in particular with electro-magnets.

Take a feed device in which the cylinders have an internal diameter of 3 mm., the travel of the piston being 1.4 mm. At each movement of the piston, the volume displaced is $v=\pi R^2 L$, where R is the radius of the cylinder and L the travel of the piston in mm. In the present example, $v=10$ cu. mm. At each cycle therefore a volume of 10 cu. mm. is delivered. In order to deliver a volume of 1 cu. cm., or 1,000 cu. mm., it is thus only necessary to repeat the same cycle 100 times. In the present case, it is possible to complete 5 cycles per second. It will therefore take 20 seconds to deliver 1 cu. cm.

If the sequence of movements is effected in the reverse direction, that is to say opening of $ef$, opening of $cd$, and closure of $ef$, opening of $ab$ and closure of $cd$, closure of $ab$, it is possible to extract the liquid from the reservoir $y$ to the reservoir $x$. It should be noted that this apparatus operates independently of gravity and can therefore be utilized in any position, vertical or horizontal.

Furthermore, the apparatus can be utilized just as well for gases as for liquids. According to the type of fluid which it is desired to deliver, the fluid-tightness may be obtained by various methods: lubrication or precise grinding-in of the pistons and cylinders, application of a joint at the extremity of the pistons, or bearing surfaces of polytetrafluoro-ethylene.

The number of driving units arranged in series in order to form a feed device is not necessarily limited to three. A greater number may be desirable so as to obtain a higher accuracy of the output or to attenuate the small manufacturing differences which could exist between the various driving units.

In accordance with the method of the present invention, a number of feed devices are arranged side by side and operate simultaneously in parallel. In order to obtain this result, the corresponding pistons of all the feed devices are attached to a single rigid frame. In other words, the upper pistons are attached to the same upper frame, the central and lower pistons being fixed respectively to two other corresponding frames.

In FIG. 1, only two feed devices $g_1$ and $g_2$ have been shown, mounted side by side. The corresponding pistons $a_1$ and $a_2$ are coupled to each other by a rigid transverse bar $h_1$. In reality, there exists a greater number of feed devices arranged in parallel. This series of feed devices is shown in transverse section effected at the level of the units $ab$ in FIG. 8.

In order to group together the greatest number of feed devices in the smallest possible space, some of them are placed side by side on the same row (feed devices $g_1$, $g_2$ and $g_3$), others are arranged on other rows (feed devices $g_4$, $g_5$ and $g_6$). Their pistons $a$ are connected to each other by transverse bars $h_1$ and $h_2$. These transverse bars are in turn fixed to each other by perpendicular bars $k_1$ and $k_2$. The series of bars $h$ and $k$ thus constitutes a frame to which are fixed all the pistons $a$. When this frame, mounted on ball-bearings, is moved in the direction of the arrow (see FIG. 8), all the pistons $a$ are pushed to the bottom of the cylinders $b$ and in consequence the units $ab$ are closed. When the frame is moved in the opposite direction, the pistons $a$ are withdrawn from the cylinders $b$ and the units $ab$ are open. A stop-notch enables the travel of the frame and thence the travel of the pistons $a$ to be limited at will. In FIG. 8, the intersection curve of the opening $p$ with the cylinders $b$ has also been indicated in dotted lines.

In the same way, the pistons $c$ of the various feed devices are coupled to each other by transverse bars $l$ and perpendicular bars $m$ (FIG. 1), the whole constituting the central frame. The pistons $e$ are coupled to each other by the bars $n$ and $o$ (FIG. 1), the whole constituting the lower frame.

The movement of the bars generating the simultaneous movement of the pistons of the various feed devices may be carried out in the manner shown in FIG. 9.

A frame $q_1$ to $q_3$, comprising a window $r$, moves alternately in the opposite directions F1 and F2 through the intermediary of a cam $s_1$, $s_2$, $s_3$, driven by a common shaft $i$ of the three cams $s_1$, $s_2$, $s_3$. Each cam may for example have the shape of a quadrant, as shown in FIG. 9. The movement F1, F2 is transmitted in the form of an analogous alternating movement but of reduced amplitude with respect to the movement of the series $q_1$, $q_2$, $q_3$ by means: of a first lever $\alpha 1, \alpha 2, \alpha 3$, articular at 1, 1′, 1″ on the frame $q(1,2,3)$ and on the other hand at 2, 2′, 2″ on the bell crank lever $\beta(1,2,3)$ which pivots about a shaft 3, 3′, 3″, fixed to the framework; and a second lever $\gamma 1, \gamma 2, \gamma 3$, articulated in turn on the one hand at 4, 4′, 4″ on the bell crank $\beta(1,2,3)$ and at 5, 5′, 5″ on a part $\epsilon(1,2,3)$ rigidly fixed to the frame. In FIG. 9, there have also been shown a device for stopping the mechanism, constituted by a stop $\lambda$.

Any other system could be adopted, in particular electro-magnets.

EXAMPLE 2

In order to give an idea of the small overall size of this system, the case of the previous example will again be taken, in which the driving units were of small dimensions (3 mm. in diameter). Under these conditions, the height of a feed device comprising three units in series does not exceed 30 mm. It is possible to place 5 feed devices in parallel in a single row and to arrange 5 rows, one behind the other. The whole apparatus thus comprises 25 feed devices and has a section which cannot exceed 110 mm. inside.

When coupled to a reversible motor system with variable speed on the one hand and to an impulse counter controlling the automatic stopping of the driving system on the other, this apparatus can automatically carry out the same cycle a large number of times, each cycle permitting all the feed devices to transfer simultaneously a fixed volume of fluid. Depending on whether the sequence of the movements of the pistons are reversed or not, the transfer is effected at will in the direction of extraction of fluid from $y$ towards $x$ or a delivery of fluid from $x$ towards $y$. The counter serves to predetermine the number of cycles which the apparatus is to effect before it is automatically stopped. It will be understood that the apparatus can only deliver accurate quantities on condition that it has been purged of the air which it contains and that it is filled with fluid to be delivered before any other manipulation.

These considerations explain the necessity:

(1) Of providing a communication between the driving units by an opening located at the extremity of the units, close to the bottom of the cylinders, so that no air bubbles remain caught in the dead angles.

(2) Of providing driving units of dimensions adapted to the volumes which it is desired to deliver, so that the travel of the pistons is of small amplitude. In this case, the inertia of the system is not great and a larger number of cycles can be rapidly executed in a very short time.

EXAMPLE 3

Again considering the case described in the previous example, namely 25 feed devices working in parallel and comprising three driving units of 3 mm. internal diameter with a piston travel of 1.4 mm., it is seen that only 20 seconds is required to deliver or extract 25 times 1 cu. cm., or 1,000 cu. mm., since the apparatus can work at the rate of 5 cycles per second and 1 cycle enables 10 cu. mm. of fluid to be transferred.

The total volume delivered or extracted can be modified at will in steps of 10 cu. mm., depending on whether the apparatus carries out one or more cycles more or less. The speed of the movements can be reduced if it is only desired to deliver 40 or 50 cu. mm. or to cause the apparatus to execute 4 or 5 cycles. It can be increased to a certain extent if it is desired to deliver quantities larger than 1 cu. cm. by the same apparatus, but it is obvious that, depending on the viscosity of the fluids in question and their inertia, a certain speed cannot be exceeded. Thus, in the present case, taking into account the dimensions of the driving units, volumes of 10 cu. mm. to 10,000 cu. mm., can be delivered in a reasonably short time. On the other hand, if the volumes which it is desired to deliver are of the order of a litre, the driving units of the apparatus must be given greater dimensions.

The measures chosen in the present description have only been given by way of example and cannot in any case constitute any limitation on the dimensions of the apparatus forming the object of the invention.

Taking these remarks into account, it is nevertheless true that a model of certain dimensions has wide possibilities and enables variable volumes of fluid to be transferred in a very short time, since 25 feed devices or even more can operate simultaneously. In addition, the feed devices can transfer either the same fluid or a number of different fluids. Thus, the reservoir $x$ can be common to the 25 feed devices. When it is filled with fluid, the same volume of this fluid can be delivered into 25 separate reservoirs $y$. On the other hand, it is possible to consider 25 separate reservoirs $x$, one per feed device, each filled with a different fluid, for example solutions of various strengths. In this case, the 25 solutions are delivered simultaneously in the same manner into 25 different reservoirs $y$.

The invention is of course not limited to the form of embodiment described and shown, and is capable of receiving various alternative forms which fall within the scope and the spirit of the invention.

I claim:

1. Volumetric pump between an inlet and an outlet of fluid comprising at least three pistons reciprocating each in one cylinder, the cylinders being related to each other and to the inlet and outlet by passages, the pistons being controlled by a reversible cyclic means and closing periodically one or more passages, so that at all times in the cycle at least one piston be in the closed position between said inlet and said outlet and said passages being formed in each cylinder close to the bottom corner in order to eliminate all vacant space.

2. Volumetric pump according to claim 1 in which said cyclic means are cam shaft controls.

3. Volumetric pump according to claim 1 in which said section of said passages is substantially cylindrical.

4. Volumetric pump without valves according to claim 3 in which reversibly the dosing from inlet to outlet is accurately the same, the flow deducted at each second between being regulated accurately by the number of cycles per second exclusively of all regulations of the reciprocating distances formed on the pistons, said number of cycles being measured at the centre, a control panel and an impulse counter controlling the starting up and automatic stopping.

5. A multi-stage volumetric dosing pump for transferring a predetermined volume of fluid without the use of valves, comprising a fluid delivery reservoir, a fluid receiving reservoir and a passageway connecting said delivery reservoir and said receiving reservoir for the passage of fluid from said delivery reservoir to said receiving reservoir;

a first driving unit, a second driving unit and a third driving unit disposed in series along said passageway, each said driving unit comprising a cylinder and a piston for reciprocating therein, said driving units communicating with each other along said passageway located at the extremity of each driving unit at the bottom of the cylinders, said driving units being of convenient size to a range of volumes of control, these volumes having a value being convenient to be controlled by a repeated cycle according to the movement of delivery; and reversible cyclic control means for said pistons to periodically open and close said passageway at each of said driving units in accordance with the following program:

(a) all said driving units are closed with each respective piston adjacent the bottom of its respective cylinder;

(b) said first driving unit is open with said predetermined volume of fluid in the first cylinder in the space vacated by the first piston;

(c) the first and third driving units are closed with the second driving unit being open, the predetermined volume of fluid having been transferred from the first cylinder to the second;

(d) the first and second driving units are closed with the third being open, the predetermined volume of fluid having been transferred from the second cylinder to the third; and (e) all three driving units are closed as in step 1; whereby the travel of said pistons is of small amplitude and the delivery time is of short duration.

6. A device in accordance with claim 5 wherein the closing movement of the piston in the first driving unit has a slight delay with respect to the opening of the piston in the second driving unit; and wherein the closing movement of the piston of the second driving unit has a slight delay with respect to the opening of the piston of the third driving unit.

7. Pumping equipment without valves, comprising more than one pump according to claim 5.

8. Pumping equipment according to claim 7 comprising several pumps working in parallel by means of rigid frames which connect to each other the pistons of the corresponding driving units being fixed to the same upper frame, the pistons of the central and lower driving units being respectively fixed to a central frame and to a lower frame.

9. A volumetric pumping installation as claimed in claim 8, in which said multi-stage volumetric pumps are connected to delivery reservoirs of different fluids and the deliveries of said pumps in parellel are directed to different receiving reservoirs, or in which said multi-stage volumetric pumps are connected to a single delivery reservoir containing one fluid and the delivery of said pumps in parallel are directed to different receiving reservoirs.

References Cited

UNITED STATES PATENTS

| 765,731 | 7/1904 | Hooton et al. | 222—255 XR |
| 3,327,640 | 6/1967 | Townsend | 103—169 |

FOREIGN PATENTS

| 17,912 | 1887 | Great Britain. |
| 193,939 | 2/1923 | Great Britain. |

ROBERT M. WALKER, Primary Examiner

U.S. Cl. X.R.

103—169; 222—255